(12) United States Patent
Radtke et al.

(10) Patent No.: US 11,198,600 B2
(45) Date of Patent: Dec. 14, 2021

(54) WORK VEHICLE WITH ELECTRICAL ENERGY STORAGE

(71) Applicant: Weidemann GmbH, Diemelsee-Flechtdorf (DE)

(72) Inventors: Fabian Radtke, Korbach (DE); Jan Prechel, Korbach (DE)

(73) Assignee: Weidemann GmbH, Diemelsee-Flechtdorf (DE)

( * ) Notice: Subject to any disclaimer, the term of this patent is extended or adjusted under 35 U.S.C. 154(b) by 0 days.

(21) Appl. No.: 16/447,513

(22) Filed: Jun. 20, 2019

(65) Prior Publication Data

US 2019/0389705 A1 Dec. 26, 2019

(30) Foreign Application Priority Data

Jun. 22, 2018 (DE) .................... 10 2018 115 036.9

(51) Int. Cl.
*B66F 9/065* (2006.01)
*B62D 21/18* (2006.01)
*B62D 33/06* (2006.01)

(52) U.S. Cl.
CPC .......... *B66F 9/0655* (2013.01); *B62D 21/186* (2013.01); *B62D 33/0617* (2013.01)

(58) Field of Classification Search
CPC .... B60K 2001/0405; B60K 2001/0411; B60K 2001/0416; B60K 2001/0438; B66F 9/07513; B66F 9/07531
USPC ...................................................... 180/68.5
See application file for complete search history.

(56) References Cited

U.S. PATENT DOCUMENTS

| | | | | |
|---|---|---|---|---|
| 4,013,136 A | * | 3/1977 | Fear ....................... | B60R 16/04 180/68.5 |
| 6,491,123 B1 | * | 12/2002 | Pasquini ................. | E02F 3/325 172/6 |
| 7,828,099 B2 | * | 11/2010 | Heckeroth .............. | B60L 8/003 180/68.5 |
| 8,100,210 B2 | * | 1/2012 | Takeuchi ................ | B60L 50/40 180/68.5 |
| 8,381,856 B2 | * | 2/2013 | Shimomura ............ | B60K 1/04 180/68.5 |
| 8,413,676 B2 | * | 4/2013 | Umizaki ................ | B60K 15/01 137/354 |
| 8,474,560 B1 | * | 7/2013 | Konz ...................... | B60R 16/04 180/68.5 |
| 8,540,042 B2 | * | 9/2013 | Atarashi ................. | B60L 58/26 180/68.1 |

(Continued)

FOREIGN PATENT DOCUMENTS

DE 102017004006 11/2017
EP 3103666 12/2016

*Primary Examiner* — Jeffrey J Restifo
(74) *Attorney, Agent, or Firm* — Boyle Fredrickson S.C.

(57) ABSTRACT

A work vehicle includes a vehicle frame which is supported by first and second axles. A driver's cab, a lifting arm, and at least one electrical energy store unit are supported on the vehicle frame. The lifting arm is arranged along a longitudinal direction of the work vehicle parallel to a longitudinal axis of the vehicle frame. The driver's cab is arranged to a first side of the longitudinal axis between the two axles. The at least one energy store unit is arranged between the two axles to a second side of the longitudinal axis, which is situated opposite the first side.

11 Claims, 2 Drawing Sheets

(56) References Cited

U.S. PATENT DOCUMENTS

| | | | | |
|---|---|---|---|---|
| 8,631,890 B2* | 1/2014 | Noguchi | ................. | E02F 9/207 |
| | | | | 180/68.1 |
| 8,662,969 B2* | 3/2014 | Shimomura | .......... | E02F 9/2217 |
| | | | | 454/141 |
| 8,727,055 B2* | 5/2014 | Matsumura | ........... | E02F 9/0858 |
| | | | | 180/68.5 |
| 8,875,823 B2* | 11/2014 | Lauper, Jr. | ................ | F01P 5/06 |
| | | | | 180/68.1 |
| 8,899,361 B2* | 12/2014 | Goto | ..................... | E02F 9/0883 |
| | | | | 180/65.21 |
| 8,973,692 B1* | 3/2015 | Okuda | ................. | E02F 9/0883 |
| | | | | 180/68.5 |
| 9,290,093 B2* | 3/2016 | Turner | ................... | B60K 16/00 |
| 9,365,401 B2* | 6/2016 | Nakazawa | .......... | B66F 9/07531 |
| 9,376,298 B2* | 6/2016 | Nakazawa | ................ | B66F 9/22 |
| 9,605,408 B2* | 3/2017 | Satake | ................ | H01R 33/975 |
| 9,890,517 B2* | 2/2018 | Kaneko | ................... | B60K 6/46 |
| 9,896,822 B2* | 2/2018 | Kohno | ............. | H01M 10/6554 |
| 9,975,522 B2* | 5/2018 | Nakamura | ............ | E05B 49/00 |
| 9,991,928 B2* | 6/2018 | Mizutani | ................ | H04W 4/02 |
| 10,000,908 B2* | 6/2018 | Ota | ......................... | B60K 6/28 |
| 10,066,358 B2* | 9/2018 | Ota | .......................... | F01P 5/02 |
| 10,465,719 B2* | 11/2019 | Nomura | ............... | B60R 25/245 |
| 10,479,354 B2* | 11/2019 | Posselius | ............. | B60W 10/20 |
| 10,583,866 B2* | 3/2020 | Kobayashi | ............. | B60R 3/005 |
| 2004/0098983 A1* | 5/2004 | Naruse | ................. | E02F 9/2075 |
| | | | | 60/428 |
| 2010/0297926 A1* | 11/2010 | Shimomura | ............. | B60K 1/04 |
| | | | | 454/141 |
| 2011/0233931 A1* | 9/2011 | Weber | .................. | E02F 9/2217 |
| | | | | 290/7 |
| 2013/0230376 A1 | 9/2013 | Soma' et al. | | |
| 2014/0332294 A1 | 11/2014 | Soma' et al. | | |

* cited by examiner

WORK VEHICLE WITH ELECTRICAL ENERGY STORAGE

BACKGROUND OF THE INVENTION

1. Field of the Invention

The invention relates to a work vehicle having a vehicle frame, which is supported by two axles, having a driver's cab and having a lifting arm. The lifting arm is arranged along a longitudinal direction of the work vehicle substantially parallel to a longitudinal axis of the vehicle frame. The driver's cab is arranged to a first side of the longitudinal axis between the axles.

2. Description of the Related Art

Such work vehicles are known and are commonly also referred to as telescopic handlers. They are commonly used in agriculture or in the construction industry for the purposes of transporting material. Here, by way of their telescopic arm, they can not only relocate material on the ground but can also set said material down at a height, for example in order to load a transport vehicle. Furthermore, variants are also known which do not have a telescopic arm but which, owing to their otherwise corresponding design, fall into the same category of construction machines.

In the case of such work vehicles, the stability of the vehicle is of major importance. Owing to the pivotable and in particular telescopic, that is to say extendable arm, the center of gravity moves as the arm is raised, such that hazardous situations can arise. This also arises in particular from the fact that such machines are commonly used on unsealed and uneven ground. Even in the case of work vehicles without a telescopic lifting arm, that is to say with a fixed length, lifting of the arm with a load supported thereon gives rise to the risk of the vehicle tipping over. Furthermore, there is a trend toward work machines being equipped with environmentally friendly drives.

SUMMARY OF THE INVENTION

It is therefore an object of the invention for a work vehicle to be provided with improved stability and a modern drivetrain.

The object is achieved by a work vehicle including a vehicle frame which is supported by two axles. The work vehicle further comprises a driver's cab, a lifting arm and at least one electric energy store unit. The lifting arm is arranged along a longitudinal direction of the work vehicle, the driver's cab is arranged to a first side of the longitudinal axis between the axles, and the at least one energy store unit is arranged between the axles to a second side of the longitudinal axis which is situated opposite the first side. A "lifting arm" is to be understood to mean an arm on the end of which there is arranged a tool holder for the exchangeable attachment of work tools, such as for example a pallet fork or shovel.

The lifting arm may be formed with a fixed length, or else as a telescopic arm. A telescopic arm is formed from at least one hollow outer arm, into the cavity of which at least one further arm element is slid in and extendable.

The two axles are arranged spaced apart from one another on the vehicle frame and are assigned respectively to a vehicle front end and to a vehicle rear end. Between the axles, there is formed a space in which other elements of the work vehicle may be arranged. The axles are thus arranged spaced apart along the vehicle longitudinal axis, such that a spacing exists between them. "Axles" are to be understood not only to mean load-bearing axles, in the sense of a component which extends over a width of the vehicle. Axles are also to be understood as axes of rotation of the wheels. In the case of three-wheeled work vehicles, it is for example possible for two wheels to be arranged on a common axis of rotation, wherein the third wheel rotates about its own axis of rotation, and thus all of the above-stated features of the two axles are likewise realized. Likewise, in the case of work vehicles with four individually mounted wheels, two axes of rotation are formed, which are to be regarded as axles. In one variant, the lifting arm may extend with a first end beyond the vehicle frame and, at a second end, be connected pivotably to the vehicle frame by means of a fastening region.

It is advantageous if the fastening region is, in a main direction of travel, arranged closer to a vehicle rear end than to a vehicle front end. The vehicle rear end and vehicle front end are defined by the main direction of travel. The main direction of travel is the direction in which the view of a driver seated in the driver's cab is directed when seated, that is to say in which the driver's cab is oriented.

Provision may also be made whereby an electrically driven hydraulic pump for the work functions of the work vehicle is arranged on the other side of the longitudinal axis of the vehicle frame in relation to the at least one energy store unit. The work functions are in this case the raising and lowering of the arm and the retraction and extension movements thereof. Aside from these, depending on the specification of the work vehicle, yet further functions may also be provided, such as for example hydraulic attachments on the arm.

In one embodiment, the hydraulic pump for the work function may be drivable by means of an electric motor, with a motor shaft of the electric motor being arranged transversely with respect to the longitudinal axis of the vehicle frame. The positioning of the electric motor transversely with respect to the longitudinal axis offers good utilization of the limited structural space. It has proven to be particularly advantageous if the electric motor is likewise arranged between the two axles.

Provision may be made whereby the energy store unit is covered by a covering, and the covering also covers at least one electrical or electronic component, such as for example an electronic controller, a contactor, a charging controller, a battery management system, a frequency converter, or a voltage converter. Coverage is to be understood in particular to mean that the respective element is protected against falling objects and preferably against external influences, such as for example the weather. An electrical or electronic component is to be understood to mean a structural element which switches and/or changes an electrical current or processes, generates and/or transmits electrical signals for the function of the work vehicle.

Furthermore, the vehicle frame may have a receiving space for the at least one energy store unit, with the receiving space having a rear wall, which runs substantially parallel to the longitudinal axis of the vehicle frame, a first side wall and a second side wall, with the two sidewalls running substantially transversely with respect to the longitudinal axis of the vehicle frame, and a base, with a top side and/or a front side being formed at least regionally by means of a movable covering. The rear wall may also be a side wall or element of the frame.

In particular, the work vehicle may be distinguished by the fact that the working hydraulics and at least one axle are driven exclusively by means of at least one electric motor. The working hydraulics and the one axle may in this case be driven by means of a single electric motor, for example by means of a driven hydraulic pump, which provides a supply both to a hydrostatic mechanism and to the work hydraulics. Furthermore, provision may however also be made for more than only one electric motor to be provided. The axle may be driven both directly by means of an electric motor, for example via an articulated shaft, or else directly, with the electric motor being arranged for example on the differential or in a wheel hub.

Also disclosed is a work vehicle which is distinguished by the fact that a position of the at least one energy store unit along the longitudinal axis of the vehicle frame is selected such that more than 50% of a weight force of the energy store unit acts on the second axle. It is preferably possible for at least 60% of the weight force of the energy store unit, preferably at least 70% thereof, to act on the second axle. Owing to the type of construction, work vehicles according to the invention are, during use, subject to the risk of tilting forward if the arm is loaded and possibly extended. It is therefore advantageous to utilize the weight of the energy store unit as a counterweight. This may be achieved by virtue of the position thereof being selected to be closer to the vehicle rear end then to the vehicle front end.

It has proven to be advantageous for a motor shaft of an electric motor for a traction drive of the work vehicle to be arranged substantially parallel to the longitudinal axis of the vehicle frame. With this arrangement, the drive power can be transmitted to the axles particularly efficiently. "Substantially parallel" is to be regarded as an orientation of the motor shaft which has a maximum deviation of 5 degrees from the longitudinal axis.

BRIEF DESCRIPTION OF THE DRAWINGS

These and further advantages and features of the invention will be discussed in more detail below on the basis of examples and with the aid of the accompanying figures, in which.

DETAILED DESCRIPTION

Figure 1:
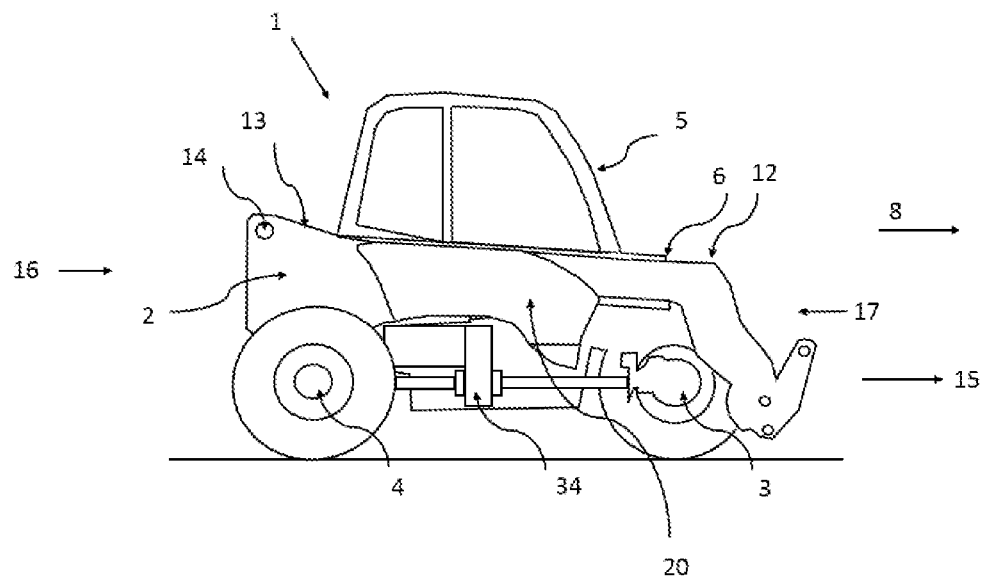
FIG. 1 is a schematic side view of a work vehicle according to the invention.
Figure 2:
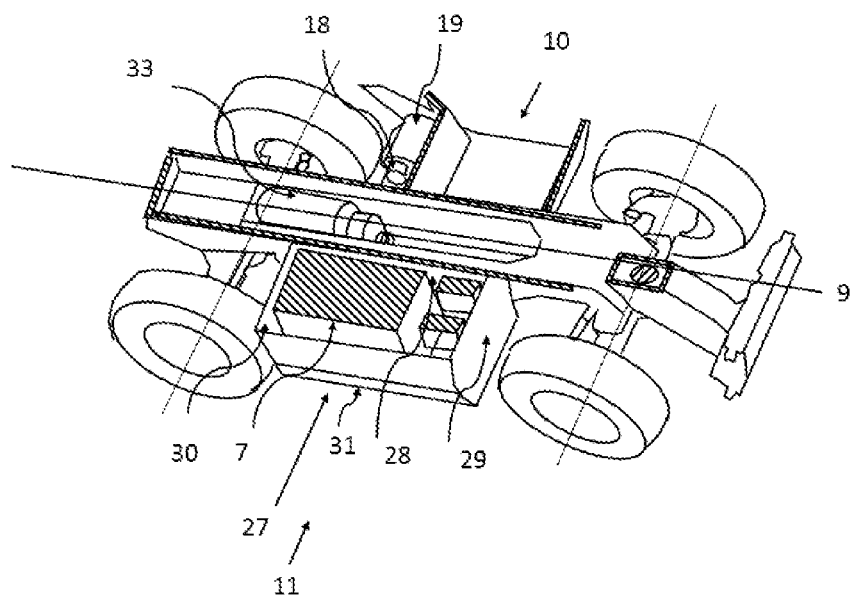
FIG. 2 is a schematic perspective sectional illustration of a work vehicle.
Figure 3:
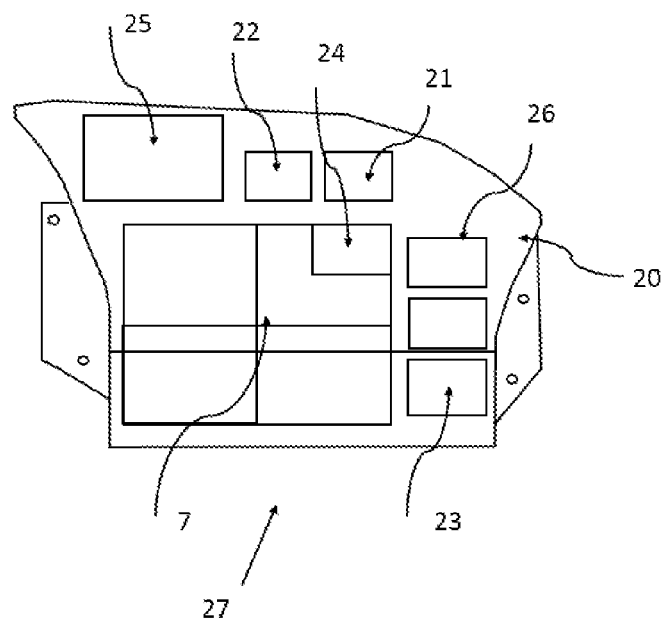
FIG. 3 shows a schematic side view of a receiving region of the energy store unit.

As can be seen in FIG. 1, a work vehicle 1 according to the invention comprises a vehicle frame 2, on which a front, first axle 3 and a rear, second axle 4 are arranged. The expressions "front" and "rear" relate to the main direction of travel 15 of the work vehicle. On the vehicle frame, there is arranged a lifting arm 6, which is hydraulically pivotable about an axis such that it can be adjusted in continuously variable fashion between a raised position and a lowered position. The axis is formed by a bolt by means of which the lifting arm is fastened, at its fastening region 14, to the vehicle frame. The lifting arm 6 runs substantially parallel to the longitudinal axis 9 of the work vehicle 1. In particular, the lifting arm runs substantially parallel to a vertical plane through which the longitudinal axis 9 runs.

Based on the main direction of travel, the vehicle rear end 16 is that region which is situated in a rear or rearward region of the work vehicle 1. The vehicle front end 17 is that region of the work vehicle which is situated at the front in the direction of travel.

In the exemplary embodiment shown, both axles are driven by means of a central transmission via articulated shafts. It is however alternatively also possible for only one axle to be driven. It is alternatively also possible for a drive axle motor to be arranged at each axle or at each wheel hub.

The first axle 3 is arranged in the vicinity of the vehicle front end 17, and the second axle 4 is arranged in the vicinity of the vehicle rear end. There is thus a spacing between the two axles 3, 4.

The work vehicle 1 furthermore comprises a driver's cab 5 which comprises a driver's workstation, such that an operator can operate the work vehicle whilst seated. The driver's cab is, as viewed in the longitudinal direction 8, arranged between the first axle 3 and the second axle 4. The driver's cab need not imperatively be closed, but rather may also be configured as an open driver's workstation, such that protection is provided only against falling objects (FOPS) and/or against a rollover of the vehicle (ROPS). The driver's cab is situated to one side, that is to say adjacent to the longitudinal axis 9. In the exemplary embodiment shown, the driver's cab 5 is, in the main direction of travel 15, arranged on the left-hand vehicle side, that is to say to the left of the longitudinal axis 9. The lifting arm extends adjacent to the driver's cab 5. In particular, the lifting arm extends from the vehicle front end past the driver's cab in the direction of the vehicle rear end. The fastening region 14 of the lifting arm is thus situated behind the driver's cab as viewed in the longitudinal direction.

Arranged to the other side of the longitudinal axis, that is to say opposite the driver's cab, is the at least one electrical energy store unit 7. In the exemplary embodiment shown, the electrical energy store unit is, in the main direction of travel 15, arranged on the right-hand vehicle side, that is to say to the right of the longitudinal axis 9. The electrical energy store unit 7 is in the form of a rechargeable battery. It may be constructed from multiple energy store modules, such that these form an energy store unit. Provision is made in particular whereby the energy store modules are arranged vertically one above the other. It is particularly preferable for at least two energy store modules to be arranged adjacent to one another in the longitudinal direction of the work vehicle. On these two energy store modules, there may then be arranged further energy store modules, giving rise to at least two mutually adjacently positioned stacks of energy store modules.

The energy store unit 7 is arranged in a receiving space 27, which is delimited by means of a rear wall 28, a first side wall 29 and a second side wall 30, and a base 31. The rear wall runs parallel to the longitudinal axis 9 of the work vehicle and may also be formed by means of a frame. The side walls 29, 30 run substantially transversely with respect to the longitudinal axis 9. In particular, the receiving space 27 may be formed as a trough in which the energy store unit is received.

In the exemplary embodiment shown, the receiving space 27 is equipped with a covering 20. The covering 20 is preferably arranged on the vehicle frame 2 and/or on the rear wall 28 by means of at least one rotary joint. Alternatively, the covering may also be fastened to the first or second side wall 29, 30. The covering is preferably arranged so as to be pivotable in order to provide access to the receiving space 27.

Alternatively, the covering 20 may also be designed to be removable, such that it must be removed from the work vehicle in order to provide access to the receiving space 27. The covering 20 is formed and arranged such that the energy store unit 7 is covered by said covering.

It is preferable for at least 50% of the base area of the receiving space to be occupied by the energy store unit. It is particularly preferable for the energy store unit to occupy at least 60% of the base area of the receiving space. The base area is to be regarded as the area which is delimited by means of the rear wall 28 and the side walls 29, 30.

In the exemplary embodiment shown, electrical components are furthermore also arranged in the receiving space 27. In the exemplary embodiment shown, the electrical components are an electronic controller 21, a contactor 22, a charging controller 23, a battery management system 24, a frequency converter 25 and a voltage converter 26.

Depending on the selected configuration of the energy store unit, individual components may be omitted. The electronic components may also be accommodated in common housings. These therefore need not imperatively be arranged separately.

The electronic controller 21 may be designed to control the functions of the work vehicle in closed-loop and/or open-loop fashion. The contactor may be designed to separate the energy store unit from an electrical network of the work vehicle. This is expedient in particular when the vehicle is at rest or also during maintenance and/or repair work on the electrical network of the vehicle. The charging controller 23 controls and monitors a charging process of the energy store unit 7 and makes the suitable voltage and/or current intensity available for the charging process. The battery management system monitors the energy store unit during operation and during the charging process. The frequency converter 25 converts the voltage of the energy store unit into the voltage required by the at least one electric motor. In the exemplary embodiment, the electrical components are likewise covered by the covering 20.

In the exemplary embodiment shown, the energy store unit 7 is arranged closer to the second axle 4 than to the first axle 3. With this arrangement, the weight force of the energy store unit 7 acts to a greater degree, that is to say in a fraction of more than 50%, on the second axle 4 than on the first axle 3.

It is preferable if at least 60% of the weight force of the energy store unit 7 acts on the second axle 4. This value is particularly preferably at least 70%. This improves the stability of the work vehicle against forward tilting when load is being carried on the lifting arm 6.

Furthermore, the weight distribution is balanced to the greatest possible degree in relation to the longitudinal axis also. That is to say, the distribution of the weight between a first side 10 of the longitudinal axis 9 and a second side 11 of the longitudinal axis 9 is particularly preferably balanced, that is to say amounts, on each side, to 50% of the total weight. The weight may however also preferably deviate within a tolerance of +/−10% on both sides, such that there may for example also be a weight distribution of 40% to 60% between the first and the second side 10, 11.

"Weight" refers to the weight of the operationally ready work machine including a driver with a weight of 80 kg in the driver's cab.

In the exemplary embodiment shown, the hydraulic pump 18 which drives the work functions of the work vehicle is arranged on that side of the longitudinal axis 9 on which the driver's cab 5 is also arranged. The pump 18 is driven by means of an electric motor 19. The electric motor 19 and pump are arranged transversely with respect to the longitudinal axis 9 of the work vehicle. This means that the motor shaft of the electric motor and the shaft of the pump 18 are arranged substantially transversely with respect to the longitudinal axis 9. It is preferable for motor 19 and pump 18 to be arranged coaxially. In the exemplary embodiment shown, the electric motor 19 and pump 18 are arranged behind the driver's cab 5 and, as viewed in the main direction of travel, in front of the second axle 4. It is particularly advantageous if electric motor 19 and pump 18 are arranged lower than a seat surface of the driver's seat.

Figure 4:
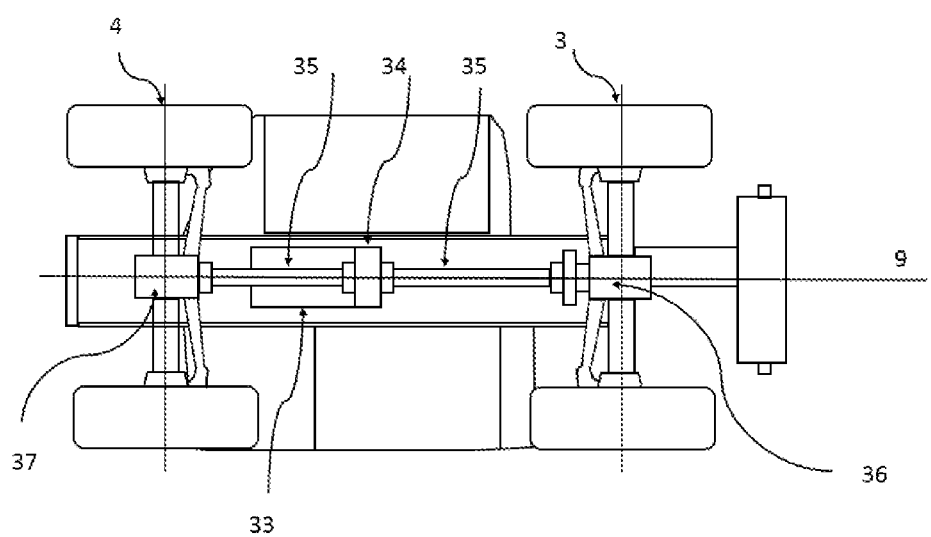
FIG. 4 shows a schematic view of the work vehicle from below.

FIG. 4 shows, in a view from below, the position of the drive for the traction drive. The electric motor 33 is arranged substantially parallel to the longitudinal axis 9. In the exemplary embodiment shown, said electric motor is arranged closer to the second axle 4 than to the first axle 3. This is advantageous because, in this position, the electric motor 33 serves as a counterweight against tilting of the work vehicle. The electric motor 33 acts on a transmission 34, on which there are arranged articulated shafts 35 for transmitting the torque to a first differential 36 at the first axle 3 and a second differential 37 at the second axle 4.

The work vehicle 1 according to the invention is driven exclusively by means of electrical energy which is stored in the at least one electrical energy store unit. The work vehicle thus in particular comprises no combustion engine. The energy required for operation of the work vehicle is thus provided exclusively in the form of stored electrical energy from the at least one energy store unit. In particular, drive energy for the traction drive and/or other functions is provided exclusively by means of electrical energy from the at least one energy store unit.

The invention claimed is:

1. A work vehicle comprising:
    a vehicle frame which is supported by a first and a second axle;
    a driver's cab;
    a lifting arm; and
    at least one electrical energy store unit, wherein
        the lifting arm is arranged along a longitudinal direction of the work vehicle, wherein
        the driver's cab is arranged to a first side of a longitudinal axis of the vehicle frame between the two axles, wherein
        the at least one energy store unit is arranged between the two axles to a second side of the longitudinal axis of the vehicle frame which is situated opposite the first side of the longitudinal axis of the vehicle frame, and
    wherein
        the work vehicle is driven exclusively via electrical energy which is stored in the at least one electrical energy storage unit;
    an electrically driven hydraulic pump for powering work functions of the work vehicle, the pump being arranged on the first side of the longitudinal axis of the vehicle frame.

2. The work vehicle as claimed in claim 1, wherein the lifting arm extends with a first end thereof beyond the vehicle frame and, at a second end thereof, is connected pivotably to the vehicle frame by a fastening region.

3. The work vehicle as claimed in claim 2, wherein the fastening region is, in a main direction of travel, arranged closer to a vehicle rear end than to a vehicle front end.

4. The work vehicle as claimed in claim 1, wherein the hydraulic pump for the work function is drivable by an electric motor, wherein a motor shaft of the electric motor is arranged transversely with respect to the longitudinal axis of the vehicle frame.

5. The work vehicle as claimed in claim 1, wherein the at least one energy store unit is covered by a covering, and wherein the covering also covers at least one electrical or electronic component including at least one of an electronic controller, a contactor, a charging controller, a battery management system, a frequency converter, and a voltage converter.

6. The work vehicle as claimed in claim 1, wherein the vehicle frame has a receiving space for the at least one energy store unit, wherein the receiving space has a rear wall which runs substantially parallel to the longitudinal axis of the vehicle frame, a first side wall, and a second side wall, wherein the first and second side walls run substantially transversely with respect to the longitudinal axis of the vehicle frame, and wherein the receiving space has a base, with a top side and/or a front side of the base being formed at least regionally by a movable covering.

7. The work vehicle as claimed in claim 1, wherein working hydraulics of the work vehicle and at least one of the two axles are driven exclusively by at least one electric motor.

8. The work vehicle as claimed in claim 1, wherein a position of the at least one energy store unit along the longitudinal axis of the vehicle frame is selected such that more than 50% of a weight force of the energy store unit acts on the second axle.

9. The work vehicle as claimed in claim 1, wherein a motor shaft of an electric motor for a traction drive of the work vehicle is arranged substantially parallel to the longitudinal axis of the vehicle frame.

10. A work vehicle comprising:
   a vehicle frame having a longitudinal axis and front and rear end portions;
   front and rear longitudinally-spaced axles that support the vehicle frame and that extend laterally from the vehicle frame;
   a driver's cab that is supported on the vehicle frame;
   a lifting arm that is supported on the vehicle frame, the lifting arm being pivotable about a lateral axis located at the rear end portion of the vehicle frame; and
   at least one electrical energy store unit, wherein
   the lifting arm extends along a longitudinal direction of the work vehicle, wherein
   the driver's cab is arranged to a first side of the longitudinal axis of the vehicle frame between the two axles, wherein
   the at least one energy store unit is arranged between the two axles to a second side of the longitudinal axis of the vehicle frame which is situated opposite the first side, and wherein
   the work vehicle is exclusively driven via electrical energy which is stored in the at least one electrical storage unit;
   wherein a position of the at least one energy store unit along the longitudinal axis of the vehicle frame is nearer the rear axle than the front axle.

11. A work vehicle comprising:
   a vehicle frame which is supported by a first and a second axle;
   a driver's cab;
   a lifting arm; and
   at least one electrical energy store unit, wherein
      the lifting arm is arranged along a longitudinal direction of the work vehicle, wherein
      the driver's cab is arranged to a first side of a longitudinal axis of the vehicle frame between the two axles, wherein
      the at least one energy store unit is arranged between the two axles to a second side of the longitudinal axis of the vehicle frame which is situated opposite the first side of the longitudinal axis of the vehicle frame, and
      wherein
      the work vehicle is driven exclusively via electrical energy which is stored in the at least one electrical energy storage unit;
   wherein a motor shaft of an electric motor for a traction drive of the work vehicle is arranged substantially parallel to the longitudinal axis of the vehicle frame.

* * * * *